(12) United States Patent
Enevoldsen et al.

(10) Patent No.: US 9,273,667 B2
(45) Date of Patent: Mar. 1, 2016

(54) WIND TURBINE BLADE

(71) Applicants: Peder Bay Enevoldsen, Vejle (DK);
Carsten Thrue, Braedstrup (DK)

(72) Inventors: Peder Bay Enevoldsen, Vejle (DK);
Carsten Thrue, Braedstrup (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 551 days.

(21) Appl. No.: 13/670,723

(22) Filed: Nov. 7, 2012

(65) Prior Publication Data

US 2013/0129520 A1    May 23, 2013

(30) Foreign Application Priority Data

Nov. 23, 2011   (EP) ..................................... 11190276

(51) Int. Cl.
*F03D 1/06* (2006.01)

(52) U.S. Cl.
CPC ............ *F03D 1/0633* (2013.01); *F03D 1/0608* (2013.01); *F05B 2240/122* (2013.01); *Y02E 10/721* (2013.01)

(58) Field of Classification Search
CPC ... F03D 1/0633; F03D 1/0641; F03D 1/0675; F03D 1/0683; F03D 3/065; F05B 2240/30; F05B 2240/301; F05B 2240/302; F05B 2240/122
See application file for complete search history.

(56) References Cited

U.S. PATENT DOCUMENTS

| | | | | |
|---|---|---|---|---|
| 3,463,418 | A | * | 8/1969 | Miksch ...................... 244/200.1 |
| 5,290,019 | A | * | 3/1994 | Beyers ............................ 269/43 |
| 6,017,120 | A | * | 1/2000 | McCormick ................. 351/112 |
| 6,365,824 | B1 | * | 4/2002 | Nakazima et al. ............ 136/251 |
| 2009/0087314 | A1 | * | 4/2009 | Haag ............................ 416/147 |
| 2011/0142637 | A1 | * | 6/2011 | Riddell et al. .................. 416/62 |

FOREIGN PATENT DOCUMENTS

| | | |
|---|---|---|
| WO | WO 0015961 A1 | 3/2000 |
| WO | WO 2007140771 A1 | 12/2007 |
| WO | WO 2008113350 A2 | 9/2008 |

* cited by examiner

*Primary Examiner* — Dwayne J White
*Assistant Examiner* — Julian Getachew

(57) ABSTRACT

A wind turbine blade is provided. The wind turbine blade has multiple vortex generators, each projecting from a surface of the blade and having a predetermined length. The vortex generators are arranged on a strip. The width of the strip is several times larger than the length of a vortex generator.

4 Claims, 2 Drawing Sheets

WIND TURBINE BLADE

CROSS REFERENCE TO RELATED APPLICATIONS

This application claims priority of European Patent Office application No. 11190276.3 EP filed Nov. 23, 2011, which is incorporated by reference herein in its entirety.

FIELD OF INVENTION

The present application relates to a wind turbine blade, comprising multiple vortex generators, each projecting from a surface of the blade and having a predetermined length, whereby the vortex generators are arranged on a strip.

BACKGROUND OF INVENTION

Wind turbines are provided with a rotor shaft which is part of an electrical generator producing electricity during movement of the rotor relative to a stator of the generator. The stator comprises a number of coils, the rotor comprises a number of permanent magnets so that an electric voltage is induced when the rotor is turned. Typically the rotor comprises three wind turbine blades.

Conventionally vortex generators are attached on wind turbine blades in order to reduce a tendency of separation of the air flow on the surface of wind turbine rotor blades. Another effect is that vortex generators counteract stall.

In WO 00/15961 A1 a wind turbine blade comprising multiple vortex generators is disclosed. Each vortex generator is wedge-shaped and extending perpendicularly out from the blade surface. There is a high risk of the vortex generators being damaged or torn off during handling of the blade, e.g. when the blade is lifted in lifting straps, due to the fragile design of the vortex generators. Vortex generators may be formed integrally with the blade, whereby each vortex generator is produced as a separate member having a bottom face which is secured to the surface of the blade by adhesion.

In WO 2008/113350 A2 a wind turbine blade with multiple vortex generators is proposed which are arranged in two or more parallel rows.

Another wind turbine blade with vortex generators is known from EP 1 314 885 A1. The vortex generators are arranged on a strip which is fixed on a surface of the rotor blade.

Experience has shown that high centrifugal forces and aerodynamic forces acting on the attached strips of vortex generators pose a risk for them to rip off over time Vortex generators installed at the tip end part of the rotor blade are worst affected by this problem. The efficiency of the vortex generators is reduced, furthermore it is both time consuming and expensive to re-fit them again.

SUMMARY OF INVENTION

It is an object of the present application to provide a wind turbine blade with an improved vortex generator installation.

According to the present application this object is achieved in the above defined wind turbine blade in that the width of the strip is several times larger than the length of a vortex generator.

In contrast to strips which are used for attaching vortex generators to conventional wind turbine blades the strip according to the disclosed wind turbine blade has a large contact area which prevents the strip with the vortex generators from being ripped off.

According to an embodiment of the disclosed wind turbine blade the width of the strip may be 2 to 10 times larger than the length of a vortex generator. Accordingly a large contact area is generated which ensures that the strip can be fixed securely on a surface of the disclosed wind turbine blade.

According to the application an adhesive may be applied on the lower surface of the strip. Due to the large contact area a good adhesive bonding is achieved so that the risk of losing vortex generators is reduced, even when vortex generators are attached at the tip end part of the wind turbine blade.

The lower surface of the strip may be provided with a countersink groove along its longitudinal direction. A double-sided adhesive tape may be applied on or in said countersink groove as to hold the strip in place while the adhesive, which is applied to the rest of the contact area of the strip, is drying. Accordingly the process of attaching the strip comprising the vortex generators on the surface of the wind turbine blade is simplified by the countersink groove.

According to a further development of the application a first end of said strip may be provided with a predetermined shape and a second end of said strip may be provided with a mating shape, respectively. Accordingly installation of several strips in longitudinal direction of the rotor blade is easier since a first end of a strip can be combined with a second end of a neighbouring strip, whereby the first end and the second end have a mating shape. Due to the mating shape the neighbouring strips are automatically arranged correctly.

According to an embodiment the first end and the second end of the strip are shaped as tongue and groove. However, other shapes are possible provided that the first end and the second end form a mating shape.

In order to further facilitate handling of the strips during installation a strip may be provided on a rope. In this case the single vortex generators are guided to be correctly positioned in relation to each other.

BRIEF DESCRIPTION OF THE DRAWINGS

The application and its underlying principle will be better understood when consideration is given to the following detailed description of embodiments. In the accompanying drawings.

DETAILED DESCRIPTION OF INVENTION

Figure 1:
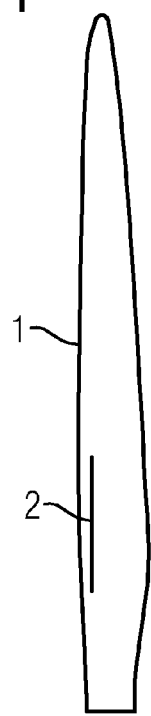
FIG. 1 is a view of a disclosed wind turbine blade.

FIG. 1 shows a rotor blade 1 for a wind turbine comprising multiple vortex generators arranged on strips 2, several strips 2 are attached on the surface of the rotor blade 1 next to each other in longitudinal direction near the leading edge.

Figure 2:
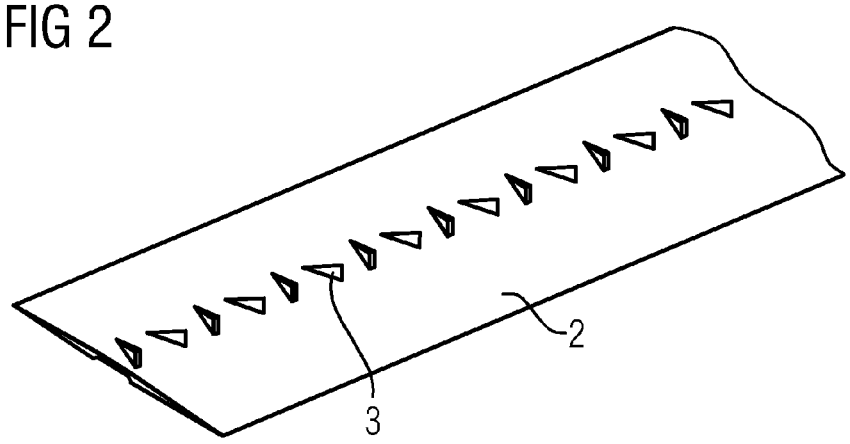
FIG. 2 is a view of a strip comprising vortex generators.

FIG. 2 is a perspective view of a strip 2 comprising multiple vortex generators 3 projecting from the surface. Each vortex generator 3 is shaped as a triangle which is positioned in an angled position with regard to the leading edge of the rotor blade 1. Vortex generators 3 reduce the tendency of separation of the air flow on the surface of the rotor blade 1.

As can be seen in FIG. 2 the width of the strip 2 is several times larger than the length of a single vortex generator, accordingly a large contact area is present on the lower side of strip 2.

Figure 3:
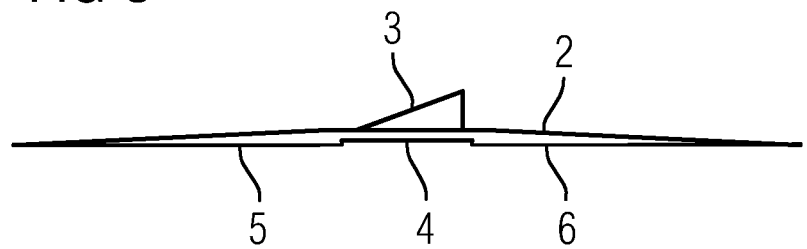
FIG. 3 is a sectional view of the strip of FIG. 2.

FIG. 3 is a sectional view of the strip 2 of FIG. 2. Typically the width of the strip 2 is 2 to 10 times larger than the length of a vortex generator 3. In the depicted embodiment the ratio strip width/vortex generator length is about 7. As the vortex generators 3 are securely fixed to the strip 2 the risk of loosening single vortex generators is minimised. In other embodiments the vortex generators 3 are integrally formed on the surface of the strip 2.

As can be seen in FIG. 3 a countersink groove 4 is formed at the lower surface of the strip 2 along its longitudinal direction.

In order to facilitate the fixing of the strips 2 on a surface of a rotor blade 1 a double-sided adhesive tape (not shown) is applied in said countersink groove 4. The adhesive tape is applied as to hold the strip 2 in place while adhesive is applied on contact areas 5, 6 at the lower side of the strip 2. When the adhesive is drying the adhesive tape holds the strip 2 in place.

Figure 4:
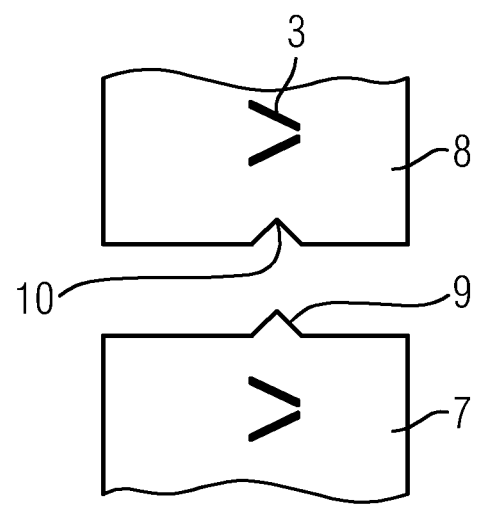
FIG. 4 is a view of end sections of a strip.

FIG. 4 shows a first end 7 of a strip and a second end 8 of a neighbouring strip. Both strips are provided with vortex generators 3 on their upper surfaces. In the depicted embodiment the end sections of the strips are provided with mating shapes, such as with a tongue 9 and a groove 10 which assure a form-fit connection of the neighbouring strips.

Typically a strip may have a length of 0.5 in and a width of 0.1 m. Several strips 2 are attached on the surface of the rotor blades 1 contacting each other in longitudinal direction.

Although the present application has been described in detail with reference to the embodiment, the present application is not limited by the disclosed examples from which the skilled person is able to derive other variations without departing from the scope of the application.

The invention claimed is:

1. A wind turbine blade, comprising: a strip; and a plurality of vortex generators arranged on the strip, wherein each of the vortex generators projects from a surface of the blade and comprises a predetermined length, wherein a width of the strip is 2 to 10 times larger than the length of each of the vortex generators, wherein an adhesive is applied on a lower surface of the strip, and wherein the lower surface of the strip is provided with a countersink groove along a longitudinal direction of the strip.

2. The wind turbine blade according to claim 1, wherein a double-sided adhesive tape is applied on the countersink groove.

3. The wind turbine blade according to claim 1, wherein a first end of the strip is provided with a predetermined shape and a second end of the strip is provided with a mating shape.

4. The wind turbine blade according to claim 3, wherein the first end and the second end of the strip are shaped as tongue and groove.

* * * * *